United States Patent
Roby et al.

(10) Patent No.: US 9,309,781 B2
(45) Date of Patent: Apr. 12, 2016

(54) HEATED BOOSTER SPLITTER PLENUM

(75) Inventors: Benjamin Roby, Cincinnati, OH (US); Jarmo Monttinen, West Chester, OH (US)

(73) Assignee: General Electric Company, Schenectady, NY (US)

( * ) Notice: Subject to any disclaimer, the term of this patent is extended or adjusted under 35 U.S.C. 154(b) by 1256 days.

(21) Appl. No.: 13/051,695

(22) Filed: Mar. 18, 2011

(65) Prior Publication Data

US 2012/0192544 A1 Aug. 2, 2012

Related U.S. Application Data

(60) Provisional application No. 61/438,251, filed on Jan. 31, 2011.

(51) Int. Cl.
*F02K 3/06* (2006.01)
*F01D 25/02* (2006.01)

(52) U.S. Cl.
CPC . *F01D 25/02* (2013.01); *F02K 3/06* (2013.01); *F05D 2240/14* (2013.01); *Y02T 50/672* (2013.01)

(58) Field of Classification Search
CPC .............. F02B 3/06; F02C 9/28; F02C 7/052; F02C 7/047; F02C 7/262; F02C 7/04; Y02T 50/671; Y02T 50/672; F02K 3/06; F01D 25/02; F01D 25/00; F04D 29/58; F05D 2260/201; F05D 2240/14
USPC .................... 60/39.01, 39.091–39.093, 226.1
See application file for complete search history.

(56) References Cited

U.S. PATENT DOCUMENTS

| | | | |
|---|---|---|---|
| 4,782,658 A | 11/1988 | Perry | |
| 4,966,229 A | 10/1990 | Senterfitt | |
| 5,763,249 A | 6/1998 | Schultz et al. | |
| 6,084,020 A | 7/2000 | Smith et al. | |
| 6,120,849 A | 9/2000 | Smith et al. | |
| 6,171,704 B1 | 1/2001 | Mosser et al. | |
| 6,362,135 B1 | 3/2002 | Greer | |
| 6,561,760 B2 * | 5/2003 | Wadia et al. | 415/145 |
| 6,725,645 B1 | 4/2004 | Wadia | |
| 6,797,795 B2 | 9/2004 | Byrd | |
| 6,809,169 B2 | 10/2004 | Byrd et al. | |

(Continued)

FOREIGN PATENT DOCUMENTS

| | | |
|---|---|---|
| GB | 458862 | 12/1936 |
| JP | 61-160395 A | 7/1986 |

(Continued)

*Primary Examiner* — Ehud Gartenberg
*Assistant Examiner* — Jared W Pike
(74) *Attorney, Agent, or Firm* — General Electric Company; Pamela A. Kachur

(57) ABSTRACT

A splitter apparatus for a gas turbine engine includes: a splitter including: an annular outer wall which defines a convex-curved leading edge at a forward end thereof; an annular floorplate positioned radially inboard of the outer wall; and an annular first bulkhead spanning between the outer wall and the floorplate. The outer wall, the floorplate, and the bulkhead collectively define an annular splitter plenum positioned adjacent the leading edge of the outer wall. At least one exhaust passage formed in the outer wall extends past the floorplate and communicates with the exterior of the splitter. At least one jumper tube assembly passes through the first bulkhead, each configured to pass air flow from the exterior of the splitter into the plenum.

13 Claims, 4 Drawing Sheets

(56) References Cited

U.S. PATENT DOCUMENTS

| | | | |
|---|---|---|---|
| 6,835,322 B2 | 12/2004 | Yoshida et al. | |
| 7,131,612 B2 * | 11/2006 | Baptist et al. | 244/134 R |
| 7,202,321 B2 | 4/2007 | Byrd et al. | |
| 7,624,581 B2 * | 12/2009 | Moniz | 60/785 |
| 7,823,374 B2 | 11/2010 | Venkataramani | |
| 7,845,159 B2 | 12/2010 | Venkataramani | |
| 7,850,120 B2 * | 12/2010 | Svanebjerg | 244/134 C |
| 7,900,437 B2 | 3/2011 | Venkataramani | |
| 7,900,438 B2 | 3/2011 | Venkataramani | |
| 2004/0065092 A1 | 4/2004 | Wadia et al. | |
| 2006/0281861 A1 | 12/2006 | Putnam | |
| 2010/0242428 A1 * | 9/2010 | Vauchel et al. | 60/39.093 |
| 2010/0319358 A1 | 12/2010 | Hogate | |

FOREIGN PATENT DOCUMENTS

| | | |
|---|---|---|
| WO | 2004078873 | 9/2004 |
| WO | 2006024032 | 3/2006 |

* cited by examiner

HEATED BOOSTER SPLITTER PLENUM

CROSS-REFERENCE TO RELATED APPLICATIONS

This application claims the benefit of provisional application 61/438,251, filed Jan. 31, 2011.

BACKGROUND OF THE INVENTION

This invention relates generally to turbine engine structures and more particularly to materials and designs for improving anti-icing characteristics from such structures.

One common type of aircraft powerplant is a turbofan engine, which includes a turbomachinery core having a high pressure compressor, combustor, and high pressure turbine in serial flow relationship. The core is operable in a known manner to generate a flow of propulsive gas. A low pressure turbine driven by the core exhaust gases drives a fan through a shaft to generate a propulsive bypass flow. The low pressure turbine also drives a low pressure compressor or "booster" which supercharges the inlet flow to the high pressure compressor.

Certain flight conditions allow for ice build up on the leading edge structures, and in particular, the fan and booster flowpath areas of the engine. One specific leading edge structure of interest is the engine's booster splitter. The splitter is an annular ring with an airfoil leading edge that is positioned immediately aft of the fan blades. Its function is to separate the airflow for combustion (via the booster) from the bypass airflow.

It is desired to minimize ice build up and shed volume from the splitter during an icing event. This in turn minimizes risk of compressor stall and compressor mechanical damage from the ingested ice.

It is known to heat engine structures for anti-icing. However, because the splitter is exposed to fan by-pass air, injection of hot air directly into the splitter would lead to insufficient heating at the nose due to heat loss to the fan air.

Accordingly, there is a need for a splitter which is efficiently heated so as to be resistant to ice buildup.

BRIEF SUMMARY OF THE INVENTION

This need is addressed by the present invention, which provides a splitter having an internal plenum supplied with heated air to reduce ice buildup, promote ice release, and reduce shedding of large ice pieces.

According to one aspect of the invention, a splitter apparatus for a gas turbine engine includes: a splitter including: an annular outer wall which defines a convex-curved leading edge at a forward end thereof; an annular floorplate positioned radially inboard of the outer wall; and an annular first bulkhead spanning between the outer wall and the floorplate. The outer wall, the floorplate, and the bulkhead collectively define an annular splitter plenum positioned adjacent the leading edge of the outer wall. At least one exhaust passage formed in the outer wall extends past the floorplate and communicates with the exterior of the splitter. A plurality of jumper tube assemblies passing through the first bulkhead, each configured to pass air flow from the exterior of the splitter into the plenum.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
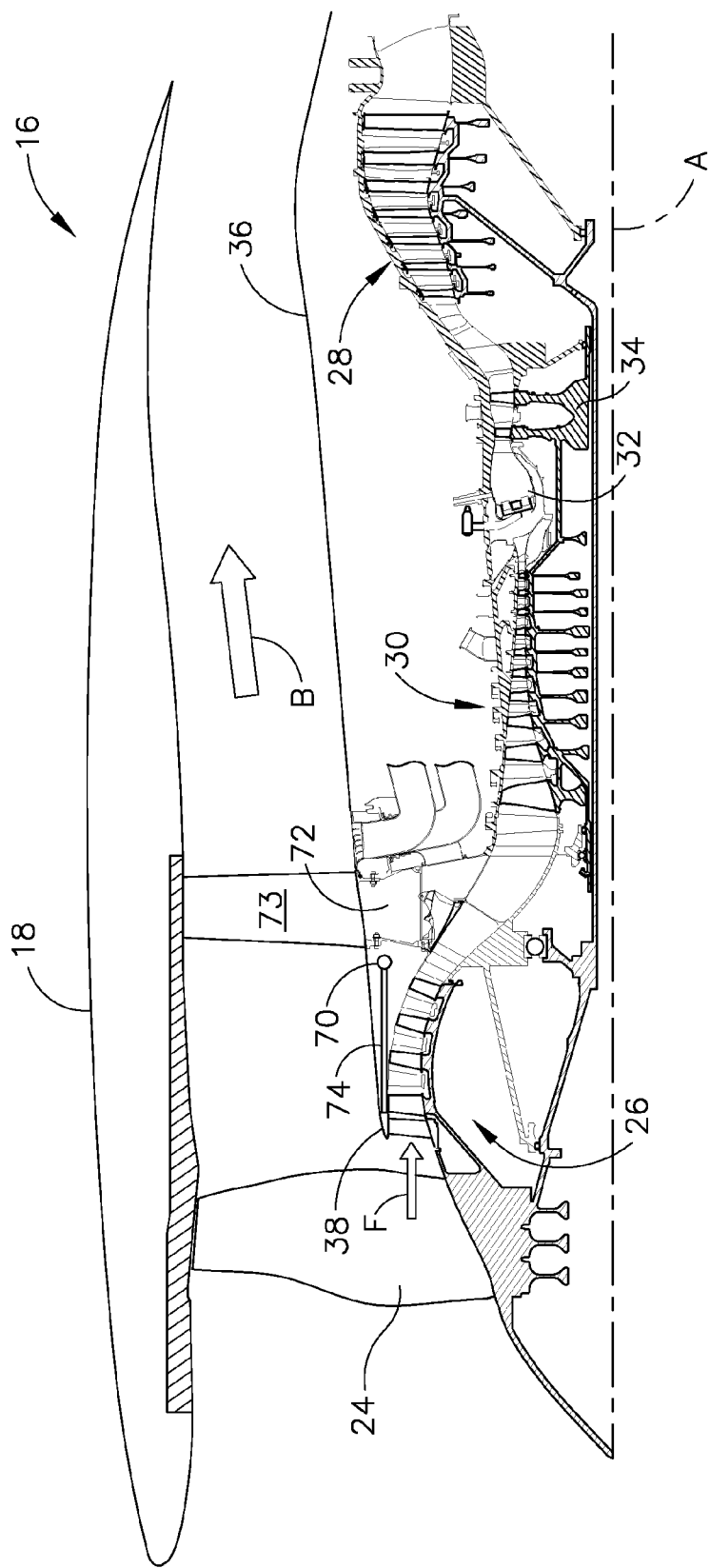
FIG. 1 is a schematic half cross-sectional view of a gas turbine engine incorporating a heated booster splitter constructed according to an aspect of the present invention.

Referring to the drawings wherein identical reference numerals denote the same elements throughout the various views, FIG. 1 depicts a known type of turbofan engine 16 mounted in a nacelle 18. While the present invention will be described further in the context of a turbofan engine, it will be understood that the principles contained to other types of engines, such as turbojet or turboshaft engines, or other kinds of leading edge structures.

The engine 16 has a longitudinal axis "A" and includes conventional components including a fan 24, a low pressure compressor or "booster" 26 and a low pressure turbine ("LPT") 28, collectively referred to as a "low pressure system", and a high pressure compressor ("HPC") 30, a combustor 32, and a high pressure turbine ("HPT") 34, collectively referred to as a "gas generator" or "core". Various components of the nacelle 18, and stationary structures of the engine 16, including a core nacelle 36, cooperate to define a core flowpath marked with an arrow "F", and a bypass duct marked with an arrow "B".

A stationary annular booster splitter 38 (or simply "splitter") is positioned at the forward end of the core nacelle 36, between the bypass duct B and the core flowpath F. The splitter 38 may be a single continuous ring, or it may be built up from arcuate segments. While a variety of materials such as metal alloys and composites may be used, the splitter 38 in this example is constructed from a known titanium alloy.

Figure 2:
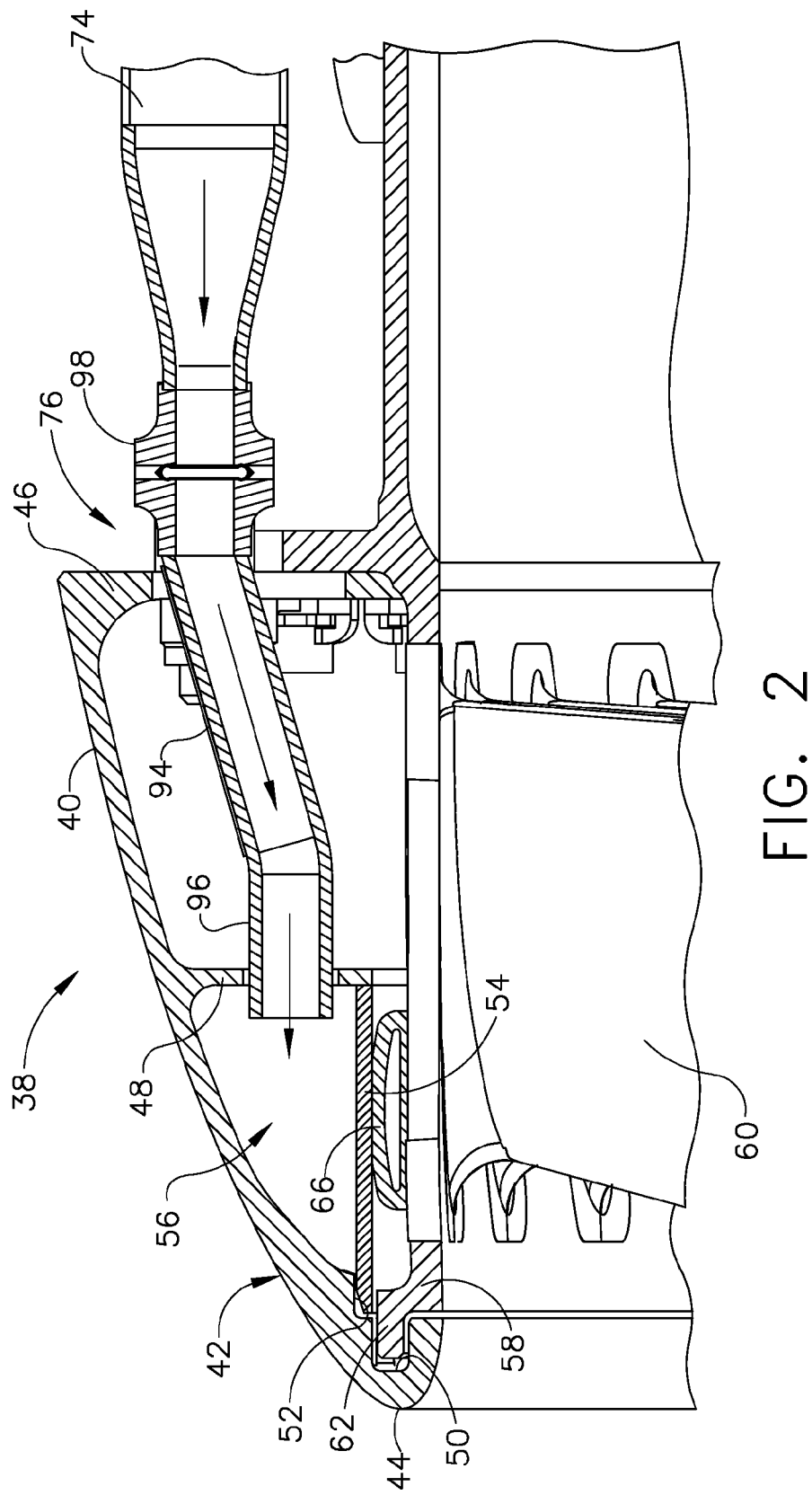
FIG. 2 is a half-sectional view of a splitter shown in FIG. 1 and surrounding structures.
Figure 3:
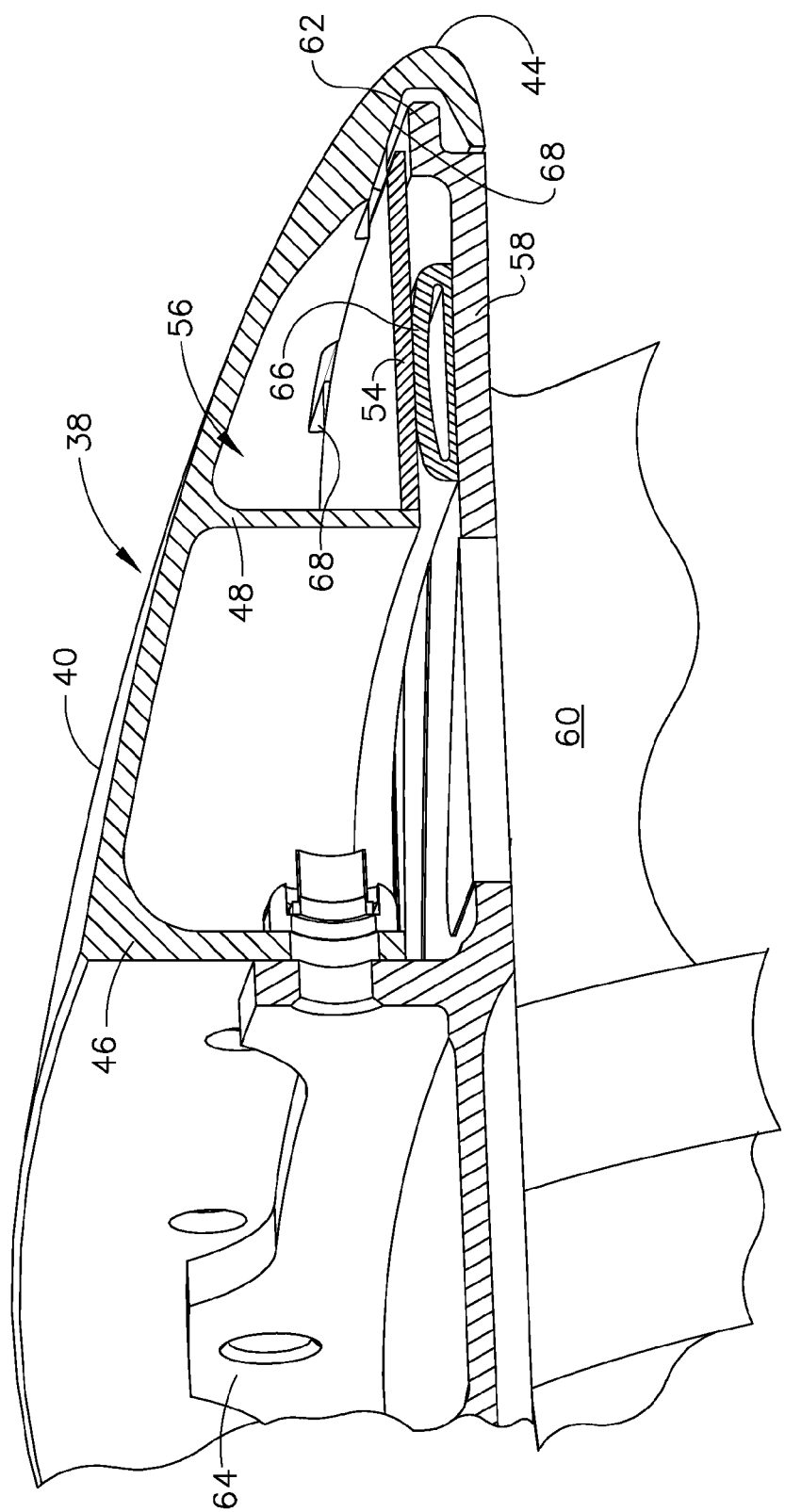
FIG. 3 is another half-sectional view of the splitter shown in FIGS. 1 and 2 and surrounding structures.

The structure of the splitter 38 is shown in more detail in FIGS. 2 and 3. The splitter 38 has an annular outer wall 40 with a convex-curved, tapered shape that defines a flowpath surface 42. The flowpath surface 42 includes a radially-outward-facing portion and a radially-inward-facing portion; the two portions are demarcated by an aerodynamic convex-curved leading edge 44 at the forward end of the splitter 38. A radially-aligned annular aft bulkhead 46 is disposed at the aft end of the splitter 38. A radially-aligned annular forward bulkhead 48 is disposed approximately halfway between the aft bulkhead 46 and the leading edge 44. The outer wall 40 and bulkheads 46 and 48 could all be constructed as one integral component. The components surrounding and positioned adjacent to the splitter 38 may be made from materials such as metal alloys or composite materials (for example, carbon-fiber epoxy composites).

An annular, axially-aligned, aft-facing groove 50 is defined by the outer wall 40 just aft of the leading edge 44. An annular step 52 is formed just aft and radially outboard of the groove 50.

An annular floorplate 54 extends axially between the outer wall 40 and the forward bulkhead 48. A forward edge of the floorplate 54 is received in the step 52. The floorplate 54 may be joined to the splitter 38 by fasteners, welding or brazing, or adhesives. Collectively, the forward portion of the outer wall 40, the forward bulkhead 48, and the floorplate 54 define a continuous 360 degree splitter plenum 56 adjacent the leading edge 44.

The splitter 38 is mounted to an annular outer band 58 which circumscribes a row (i.e. a radial array) of airfoil-shaped booster inlet guide vanes 60. Specifically, a forward rail 62 of the outer band 58 is received in the groove 50. The aft bulkhead 46 bears against and is secured to a radially-extending annular flange 64 of the outer band 58 or adjacent stationary structure, for example using bolts or other mechanical fasteners.

A resilient annular seal 66 is disposed between the outer band 58 and the floorplate 54, near the forward end of the floorplate 54, and serves to mitigate airflow leakage between the floorplate 54 and the outer band 58. In the illustrated example the seal 66 has a hollow cross-section.

An annular array of spaced-apart shallow slots 68 or other exhaust passages are formed in the inner surface of the outer wall 40 behind the leading edge 44 and adjacent the forward rail 62 of the outer band 58. The slots 68 define a generally "U"-shaped path from the splitter plenum 56 around the forward rail 62 and communicating with the inboard surface of the outer band 58, through a gap between the outer band 58 and the outer wall 40. The slots 68 are shaped, sized, and oriented to return heating air to the turbine flowpath at an angle and location selected to minimize aerodynamic disruption. In the illustrated example there is one slot 68 located between each inlet guide vane 60.

Figure 4:
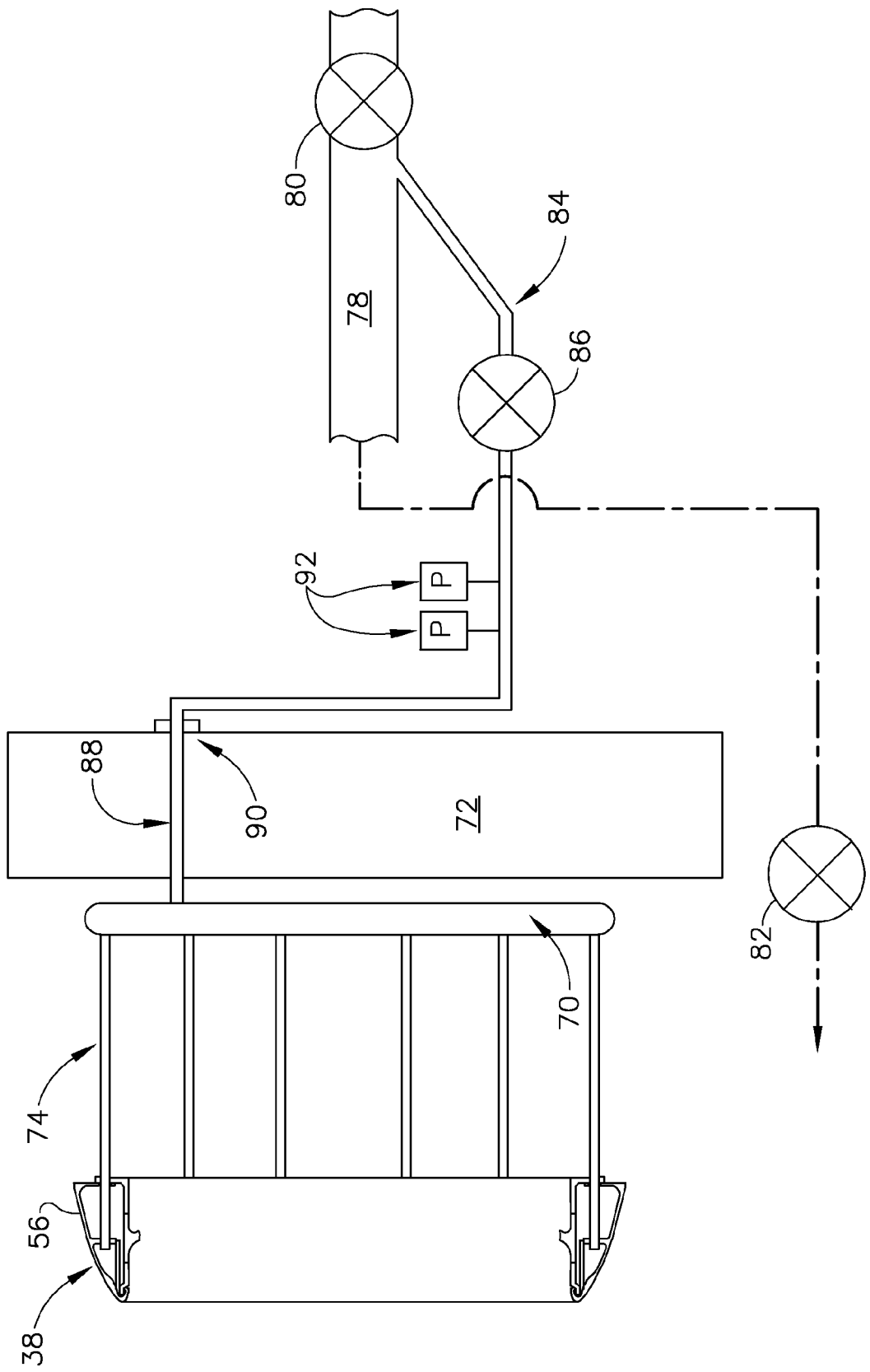
FIG. 4 is a schematic diagram showing the components used to supply heated air to the splitter.

FIG. 4 shows schematically components which may be used to supply a uniform flow of heated bleed air to the splitter plenum 56. An annular manifold 70 with wyes (also seen schematically in FIG. 1) is positioned outside the booster 26 just forward of an annular fan hub frame 72 of the engine 16. Struts 73 extend radially outward from the fan hub frame 72 to join the nacelle 18. An annular array of feed pipes 74 (which may be thermally insulated) extend axially from the manifold 70 to the splitter 38. A jumper tube assembly 76 (seen in FIG. 2) extends forward from each feed pipe 74.

The engine 16 includes a conventional engine anti-icing duct 78 which takes high-temperature pressured bleed air from the high pressure compressor 30 (in this case from the seventh compressor stage), under the control of a pressure regulating shut-off valve 80. This air is ducted through a pressure regulating valve 82 to the engine's inlet and other conventionally heated structures. A takeoff duct 84 branches from the anti-icing duct 78 to an active valve 86 which controls flow through a splitter feed duct 88. The splitter feed duct 88 passes through the fan hub frame 72 (through a boss 90) and feeds the manifold 70. The active valve 86 is controlled (for example using a electropneumatic, hydraulic, or electronic controller, not shown) according to an appropriate control law which provides heated air flow under the necessary conditions. In this example, redundant pressure transducers 92 are provided in the splitter feed duct 88 downstream of the active valve 86. They may be used to verify operation of the active valve 86. For example, if the active valve is commanded "open", but no pressure increase is sensed by the transducers 92, this is an indication that the active valve 86 has failed to actually open.

The jumper tube assemblies 76 are shown in more detail in FIG. 2. Each assembly 76 includes a jumper tube 94. The forward end 96 of the jumper tube 94 passes through the forward bulkhead 48 and at its aft end 98 passes through the aft bulkhead 46 and couples it to the feed pipe 74. The feed pipes 74 and jumper tube assemblies 76 are arranged to provide circumferentially-consistent air flow to the splitter plenum 56. In the illustrated example there are six equally-spaced feed pipes 74 with corresponding jumper tube assemblies 76.

The diameter, length, material, surface finishes and other characteristics of the ducting including the takeoff duct 84, splitter feed duct 88, manifold 70, feed pipes 74 and jumper tube assemblies 76 may be selected according to known engineering principles to provide appropriate pressure, velocity and flow rate to feed the splitter plenum 56 as needed for anti-icing operation.

In operation, the engine 16 will be exposed to icing conditions, namely the presence of moisture in temperatures near the freezing point of water. Ice will naturally tend to form on the leading edge structures including the splitter 38. As the ice mass builds up, it protrudes into the air flow and increasing aerodynamic (drag) forces act on it, eventually causing portions of it to shed from the splitter 38.

When necessary to avoid ice buildup or to cause shedding of accreted ice, the valves 80 and 86 are opened, permitting high-temperature pressurized air to enter the splitter feed duct 88 and manifold 70. The valve 86 may be used to reduce the pressure as needed. The heated air is fed into the splitter plenum 56 through the jumper tube assemblies 76. The air will circulate freely around the circumference of the splitter plenum 56, heating the outer wall 40, with the heating effect concentrated near the leading edge 44, where ice shedding is of the greatest concern. This has the effect of reducing or preventing ice buildup and/or causing shedding of already attached ice. The splitter plenum 56 may be heated in such a way that ice sheds as relatively small particles which have a reduced tendency to affect engine operation.

The spent heating air exits the splitter plenum 56 through the slots 68 which redirect the air in such a way as to minimize aerodynamic losses, such as by ejecting it parallel to the streamlines flowing past the inlet guide vanes 60. In this way the cycle penalty for using bleed air to heat the splitter 38 is reduced.

The splitter configuration described above reduces exposure to the fan air as well as provides a means to distribute heat circumferentially from the hot air injection sites. The invention described herein provides a means of unlimited operation in cold weather. Without the booster splitter plenum 56, insufficient heat would lead to ice build-up on the splitter lip during airplane ground operation. Upon run up to take-off power the ice shed would produce a stall thus delaying plane departure. A secondary benefit of the booster splitter plenum 56 is to protect the composite hardware aft of the splitter 38. Bleed air temperatures from the high pressure compressor 30 can reach 530° C. (1000° F.). By moving the hot air away from the less temperature capable composite parts, this ensures the composite does not degrade. The splitter plenum design reduces the size and weight of tubing required to heat the splitter 38 as well as the temperature and flow of bleed air needed.

The foregoing has described a heated booster splitter plenum for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only.

What is claimed is:
1. A splitter apparatus for a gas turbine engine, comprising:
a splitter including an annular outer wall which defines a convex-curved leading edge at a forward end thereof;
an annular floorplate positioned radially inboard of the outer wall;
an annular groove is defined by the outer wall just aft of the leading edge, an annular step is formed in the outer wall aft and radially outboard of the groove, and a forward edge of the floorplate is received in the step;

an annular outer band disposed radially inboard of the floorplate and a forward edge of the annular outer band is received into annular groove; and an annular first bulkhead spanning between the outer wall and the floorplate, wherein the outer wall, the floorplate, and the bulkhead collectively define an annular splitter plenum positioned adjacent the leading edge of the outer wall, and wherein at least one exhaust passage formed in the outer wall extends past the floorplate and communicates with the exterior of the splitter; and at least one jumper tube assembly passing through the first bulkhead, each of the at least one jumper tube assemblies configured to pass air flow from the exterior of the splitter into the plenum.

2. The apparatus of claim 1 wherein the at least one exhaust passage comprises a plurality of slots arrayed around the outer wall.

3. The apparatus of claim 1 further comprising an annular, resilient seal disposed between the floorplate and the outer band.

4. The apparatus of claim 1 wherein each jumper tube assembly is coupled to an axially-extending feed pipe located outside the splitter.

5. The apparatus of claim 1 further comprising an annular second bulkhead disposed at an aft end of the splitter, wherein each jumper tube assembly passes through the second bulkhead.

6. A gas turbine engine, comprising:
a rotatable fan;
a rotatable booster disposed aft of the fan;
a turbomachinery core disposed aft of the booster and operable to generate a flow of pressurized combustion gases;
an annular core nacelle surrounding the booster and the turbomachinery core;
a low-pressure turbine disposed aft of the turbomachinery core and mechanically coupled to the booster and the fan;
a radial array of airfoils disposed forward of the booster and circumscribed by an annular outer band;
a splitter disposed at a forward end of the core nacelle and surrounding the outer band, the splitter including:
an annular outer wall which defines a convex-curved leading edge at a forward end thereof;

an annular groove is defined by the outer wall just aft of the leading edge, an annular step formed in the outer wall;

an annular floorplate positioned radially inboard of the outer wall wherein a forward edge of the floorplate is received in the step;

an annular outer band disposed radially inboard of the floorplate and a forward edge of the annular outer band is reiceived into the annular groove; and an annular first bulkhead spanning between the outer wall and the floorplate, wherein the outer wall, the floorplate, and the bulkhead collectively define an annular splitter plenum positioned adjacent the leading edge of the outer wall, and wherein at least one exhaust passage formed in the outer wall extends past the floorplate and communicates with the exterior of the splitter; and at least one jumper tube assembly passing through the first bulkhead, each of the at least one jumper tube assemblies configured to pass air flow from the exterior of the splitter into the plenum.

7. The gas turbine engine of claim 6 wherein each jumper tube assembly is coupled to an axially-extending feed pipe located aft of the splitter.

8. The gas turbine engine of claim 7 further comprising:
an annular nacelle surrounding the fan and the core nacelle;
an annular fan hub frame disposed within the core nacelle, aft of the booster; and
a radial array of struts extending between the fan hub frame and the nacelle.

9. The gas turbine engine of claim 8 further comprising an annular manifold disposed within the core nacelle forward of the fan hub frame, the manifold interconnecting the feed pipes.

10. The gas turbine engine of claim 9 further comprising a splitter feed duct passing axially through the fan hub frame and connected to the manifold.

11. The gas turbine engine of claim 9 further comprising an anti-icing duct coupled to a source of high-pressure bleed air within the turbomachinery core and to the splitter feed duct.

12. The gas turbine engine of claim 11 further comprising a valve operable to block or permit flow from the anti-icing duct to the splitter feed duct.

13. The gas turbine engine of claim 12 further comprising at least one pressure transducer disposed in fluid communication with the splitter feed duct.

* * * * *